US012125427B1

(12) United States Patent
Huang et al.

(10) Patent No.: US 12,125,427 B1
(45) Date of Patent: Oct. 22, 2024

(54) METHOD FOR ADJUSTING AMBIENT CONTRAST RATIO AND ELECTRONIC APPARATUS

(71) Applicant: AUO Corporation, Hsinchu (TW)

(72) Inventors: Min Chun Huang, Hsinchu (TW); YuTang Tsai, Hsinchu (TW); Yen Wen Fang, Hsinchu (TW); Kun-Cheng Tien, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/393,593

(22) Filed: Dec. 21, 2023

(30) Foreign Application Priority Data

Sep. 27, 2023 (TW) ................................ 112137070

(51) Int. Cl.
*G09G 3/20* (2006.01)

(52) U.S. Cl.
CPC ..... *G09G 3/2007* (2013.01); *G09G 2320/066* (2013.01); *G09G 2360/144* (2013.01); *G09G 2360/16* (2013.01)

(58) Field of Classification Search
CPC .......... G09G 3/2007; G09G 2320/066; G09G 2360/144; G09G 2360/16
See application file for complete search history.

(56) References Cited

FOREIGN PATENT DOCUMENTS

| | | |
|---|---|---|
| CN | 103707769 | 4/2014 |
| CN | 105976768 | 9/2016 |
| CN | 108897509 | 11/2018 |

*Primary Examiner* — Michael Pervan
(74) *Attorney, Agent, or Firm* — JCIPRNET

(57) ABSTRACT

A method for adjusting ambient contrast ratio and an electronic apparatus are provided. The electronic apparatus includes a transparent display and a transmittance adjustment plate disposed at the back of the transparent display. In the electronic apparatus, an adjustment transmittance used to adjust the transmittance adjustment plate and a luminance percentage used to adjust the transparent display are calculated, a grayscale layer is generated based on the luminance percentage; a voltage generator is used to control the transmittance of the transmittance adjustment plate to the adjustment transmittance, and in a case that the transmittance of the transmittance adjustment plate is the adjustment transmittance, a graphic controller is used to display a frame on the transparent display while display the grayscale layer on top of the frame.

11 Claims, 5 Drawing Sheets

METHOD FOR ADJUSTING AMBIENT CONTRAST RATIO AND ELECTRONIC APPARATUS

CROSS-REFERENCE TO RELATED APPLICATION

This application claims the priority benefit of Taiwan application serial no. 112137070, filed on Sep. 27, 2023. The entirety of the above-mentioned patent application is hereby incorporated by reference herein and made a part of this specification.

BACKGROUND

Technical Field

The disclosure relates to a mechanism for adjusting a display parameter, and in particular, to a method for adjusting an ambient contrast ratio (ACR) of a transparent display and an electronic apparatus.

Related Art

In a transparent display, objects behind the display may be easily seen without installing a backlight. The clarity of both a display frame presented by a transparent display and its background image will be affected by ambient light. For example, in a high-brightness environment, the background is likely much clearer than the display frame. In a low-brightness environment, the clarity of the display frame is much greater than the background. Thus, how to build a system that is capable of changing the display contrast according to the ambient illuminance is one of the current topics.

SUMMARY

The disclosure provides a method for adjusting ambient contrast ratio and an electronic apparatus, which are capable of adjusting the ambient contrast ratio (ACR) as the ambient light changes so as to meet a preset value.

The disclosure provides a method for adjusting ambient contrast ratio for a transparent display. The method includes: providing a transmittance adjustment plate at a back of the transparent display; calculating an adjustment transmittance for adjusting the transmittance adjustment plate and a luminance percentage for adjusting the transparent display by using a processor; generating a grayscale layer through the processor based on luminance percentage; controlling a transmittance of the transmittance adjustment plate through a voltage generator to the adjustment transmittance; and when the transmittance of the transmittance adjustment plate is the adjustment transmittance, while a frame is displayed on the transparent display, displaying the grayscale layer above the frame through a graphic controller. A step of calculating the adjustment transmittance and luminance percentage includes: deciding multiple candidate results based on an ambient illuminance, an original transmittance of the transparent display, and an adjustable transmittance range of the transmittance adjustment plate, in which each of the candidate results includes a candidate luminance value and a total transmittance; selecting a final result from the multiple candidate results based on a preset ambient contrast ratio; and calculating the luminance percentage based on the candidate luminance value of the final result, and calculating the adjustment transmittance based on the total transmittance of the final result.

In an embodiment of the disclosure, a step of deciding the multiple candidate results includes: deciding a transmittance range based on the original transmittance of the transparent display and the adjustable transmittance range of the transmittance adjustment plate; finding multiple candidate luminance values in a luminance range supported by the transparent display, by using the ambient illuminance as an index; and extracting the total transmittance corresponding to each of the candidate luminance values within the transmittance range.

In an embodiment of the disclosure, a step of deciding the multiple candidate results includes: deciding a transmittance range based on the original transmittance of the transparent display and the adjustable transmittance range of the transmittance adjustment plate; and starting from an upper limit value or a lower limit value of the transmittance range, performing a search every other value so as to find the candidate luminance value and the total transmittance related to the ambient illuminance.

In an embodiment of the disclosure, a step of selecting the final result from the multiple candidate results includes: selecting one from the multiple candidate results as a selected result based on a preset order; calculating an estimated ambient contrast ratio based on a reflectance of the transparent display, the ambient illuminance, and the candidate luminance value and the total transmittance of the selected result; determining whether or not the estimated ambient contrast ratio meets the preset ambient contrast ratio; in response to the estimated ambient contrast ratio meeting the preset ambient contrast ratio, using the selected result as the final result; in response to the estimated ambient contrast ratio not meeting the preset ambient contrast ratio, based on the preset order, selecting another from the selected results as the candidate result and recalculating the estimated ambient contrast ratio until the calculated estimated ambient contrast ratio meets preset ambient contrast ratio.

In an embodiment of the disclosure, the calculation of the estimated ambient contrast ratio is obtained by using a following formula:

$$\text{ES\_ACR}_i = \frac{CL_i + (Ration \times La) + (TC_i \times La)}{(Ration \times La) + (TC_i \times La)},\ i \in [1, n]$$

$\text{ES\_ACR}_i$ is the estimated ambient contrast ratio, Ration is the reflectance of the transparent display, CLi is the candidate luminance value of the selected result, $TC_i$ is the total transmittance of the selected result, La is the ambient illuminance, and n is the number of candidate results.

In an embodiment of the disclosure, the method further includes: if none of multiple estimated ambient contrast ratios calculated from the candidate results meets the preset ambient contrast ratio, resetting a contrast range, and based on the preset order, extracting the multiple candidate results one by one so as to determine whether or not the estimated ambient contrast ratio corresponding to each of the candidate results falls within the contrast range, such that when the estimated ambient contrast ratio falling within the contrast range is obtained, a candidate result corresponding to the estimated ambient contrast ratio is used as the final result.

In an embodiment of the disclosure, the method further includes: sensing ambient illuminance through a light source sensor.

The disclosure provides an electronic apparatus, including: a transparent display; a transmittance adjustment plate, provided at a back of the transparent display; a voltage generator, coupled to the transmittance adjustment plate; a graphic controller, coupled to the transparent display; a processor, coupled to the voltage generator and the graphic controller to perform the method for adjusting ambient contrast ratio.

Based on the above, the disclosure adds a transmittance adjustment plate at the back of the transparent display, thereby adjusting the amount of ambient light entering the transparent display; and adds a grayscale layer on top of the frame displayed on the transparent display by software, so as to adjust the display luminance of the transparent display. The adjustment transmittance of the transmittance adjustment plate and the luminance percentage of the grayscale layer may be adjusted according to change in the ambient light, such that the visual effect experienced by the user will not be affected as the ambient light changes.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
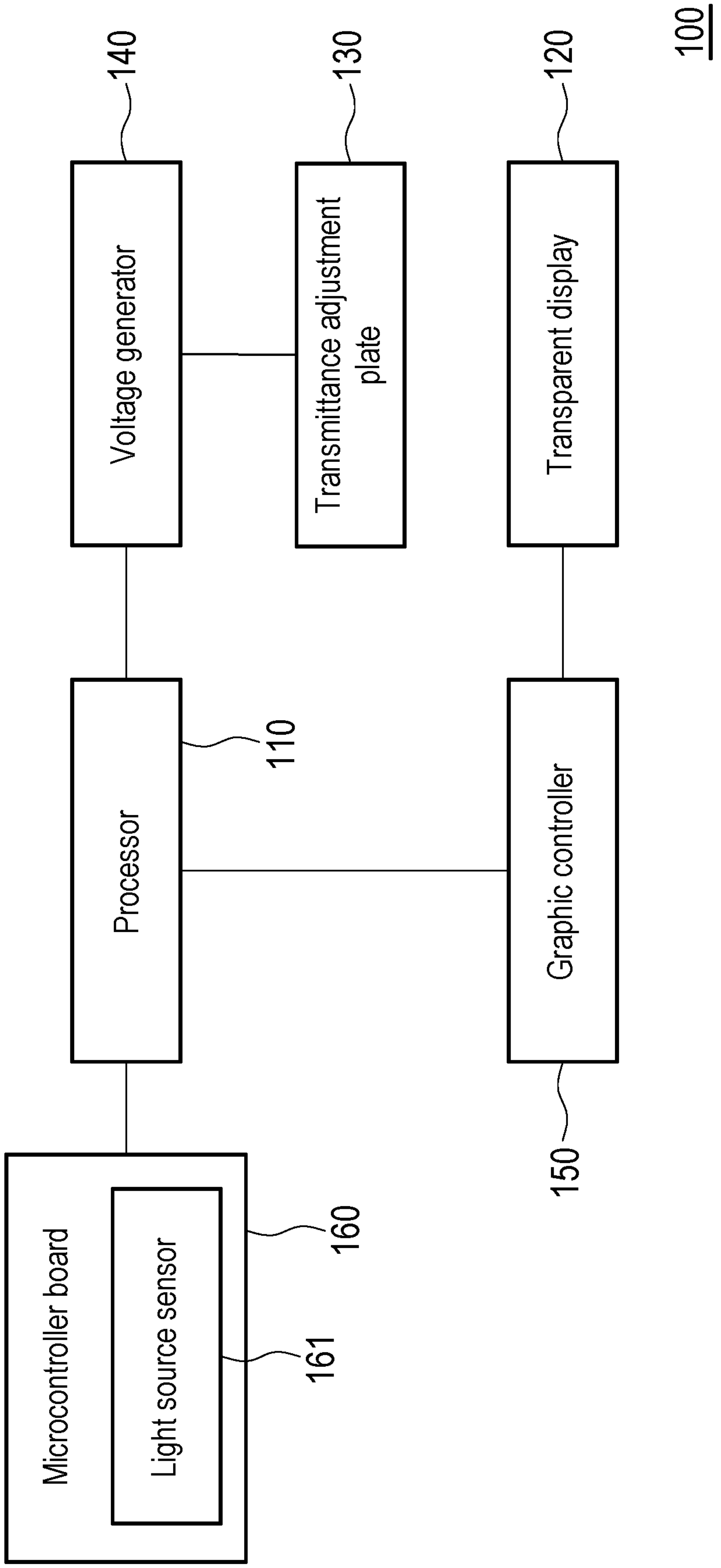
FIG. 1 is a block diagram of an electronic apparatus according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

FIG. 1 is a block diagram of an electronic apparatus according to an embodiment of the disclosure. Referring to FIG. 1, an electronic apparatus 100 includes a processor 110, a transparent display 120, a transmittance adjustment plate 130, a voltage generator 140, a graphic controller 150, and a microcontroller board 160. The voltage generator 140 is coupled to the transmittance adjustment plate 130. The graphic controller 150 is coupled to the transparent display 120. The processor 110 is coupled to the voltage generator 140 and the graphic controller 150 so as to control the transparent display 120 through the graphic controller 150 and to adjust the transmittance of the transmittance adjustment plate 130 through the voltage generator 140.

The processor 110 may be a Central Processing Unit (CPU), a Physical Processing Unit (PPU), a Programmable Microprocessor, an embedded control chip, a Digital Signal Processor (DSP), an Application Specific Integrated Circuit (ASIC), or other similar devices.

The transparent display 120 may be, for example, a transparent Liquid-Crystal Display (LCD), a transparent Organic Light-Emitting Diode (OLED) display, or other display that allows the scene behind the display to be seen. The transmittance adjustment plate 130 is provided at the back of the transparent display 120 and is implemented by a transparent panel capable of adjusting transmittance. The back refers to the other side opposite to the display surface (for viewing by the user) of the transparent display 120.

The voltage generator 140 is used to control the voltage provided to the transmittance adjustment plate 130 to thereby adjust the transmittance of the transmittance adjustment plate 130. Accordingly, an amount of ambient light entering the transparent display 120 is controlled by adjusting the transmittance of the transmittance adjustment plate 130.

The graphic controller 150 is an important element connecting the processor 110 and the transparent display 120. The graphic controller 150 assists the processor 110 in calculating image information, convert the content to be displayed, and provide progressive or interlaced scanning signals to the transparent display 120, so as to control the frames displayed by the transparent display 120. The graphic controller 150 may be, for example, a display card.

Moreover, the processor 110 is further coupled to the microcontroller board 160. In an embodiment, the microcontroller board 160 may be implemented using an Arduino integrated development environment (IDE) and a light source sensor 161. The microcontroller board 160 converts a sensed light energy into an electrical signal through the light source sensor 161, thereby obtaining an ambient illuminance (unit: Lux). The ambient illuminance is then sent to the processor 110 for the processor 110 to perform other subsequent calculations.

Figure 2:
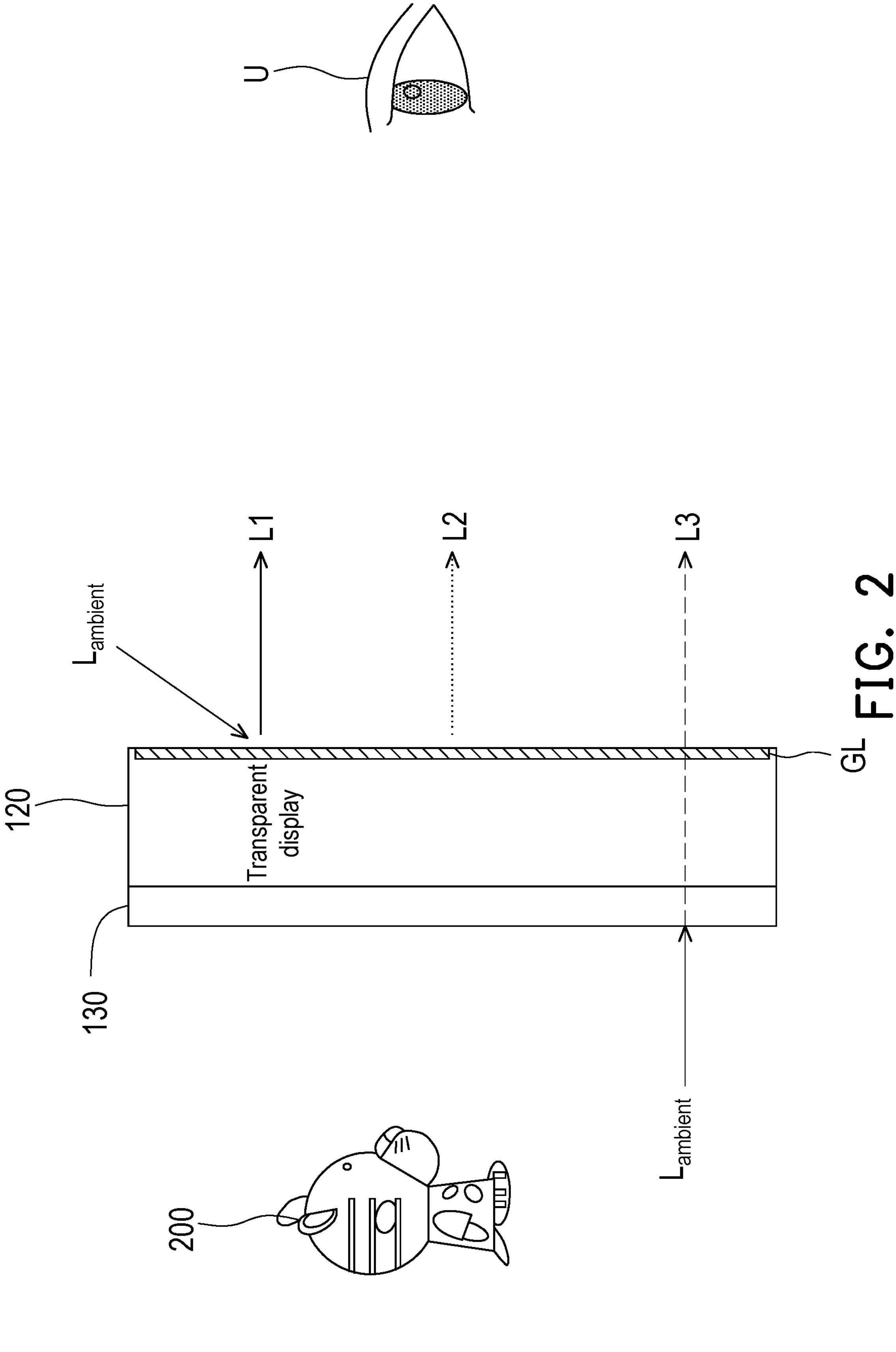
FIG. 2 is a schematic diagram of using a transparent display according to an embodiment of the disclosure.

FIG. 2 is a schematic diagram of using a transparent display according to an embodiment of the disclosure. Referring to FIG. 2, the transmittance adjustment plate 130 is provided at the back of the transparent display 120. A grayscale layer GL is added to the top layer of the display frame of the transparent display 120, and the transmittance adjustment plate 130 and the grayscale layer GL are configured to assist in adjusting the final display effect of the transparent display 120.

In this embodiment, when a user U is in front of the display surface of the transparent display 120 to view the transparent display 120, in addition to seeing the frame displayed by the transparent display 120, the user U may also see a background object 200 located at the back of the transparent display 120 through the transparent display 120. The visual experience that the eyes of user U ultimately experience will be affected by the following three types of light: namely, a reflected light L1, which is an ambient light $L_{ambient}$ reflected by the transparent display 120, a display light L2 emitted by the transparent display 120, and a transmitted light L3, which is the ambient light $L_{ambient}$ that has passed through both the transmittance adjustment plate 130 and the transparent display 120.

In this embodiment, the ambient light $L_{ambient}$ is quantified by illuminance (unit: lux). The illuminance of the reflected light L1 may be obtained by multiplying the ambient illuminance by a reflectance of the transparent display 120. The illuminance of the transmitted light L3 may be obtained by multiplying the illuminance of the $L_{ambient}$ (hereinafter referred to as "ambient illuminance") by a total transmittance of the transmittance adjustment plate 130 and the transparent display 120. Moreover, the measurement unit of the luminance of the display light L2 is nits. For computational compatibility, π may be used to convert the luminance (unit: nits) of the display light L2 into illuminance (unit: lux).

Ambient Contrast Ratio (ACR) is an important parameter for evaluating display performance, taking into account the reflected light L1, the display light L2, and the transmitted light L3. Below, a parameter Tindex represents the illuminance of the transmitted light L3, a parameter Rindex represents the illuminance of the reflected light L1, and a parameter $D_{lum}$ represents the luminance of the display light L2 (for computational compatibility, π may be used to covert the luminance of the display light L2 (unit: nits) into illuminance (unit: lux)), and a parameter ACR represents the ambient contrast ratio. The ambient contrast ratio ACR is calculated as follows:

$$ACR = \frac{D_{lum} + Rindex + Tindex}{Rindex + Tindex}$$

Figure 3:
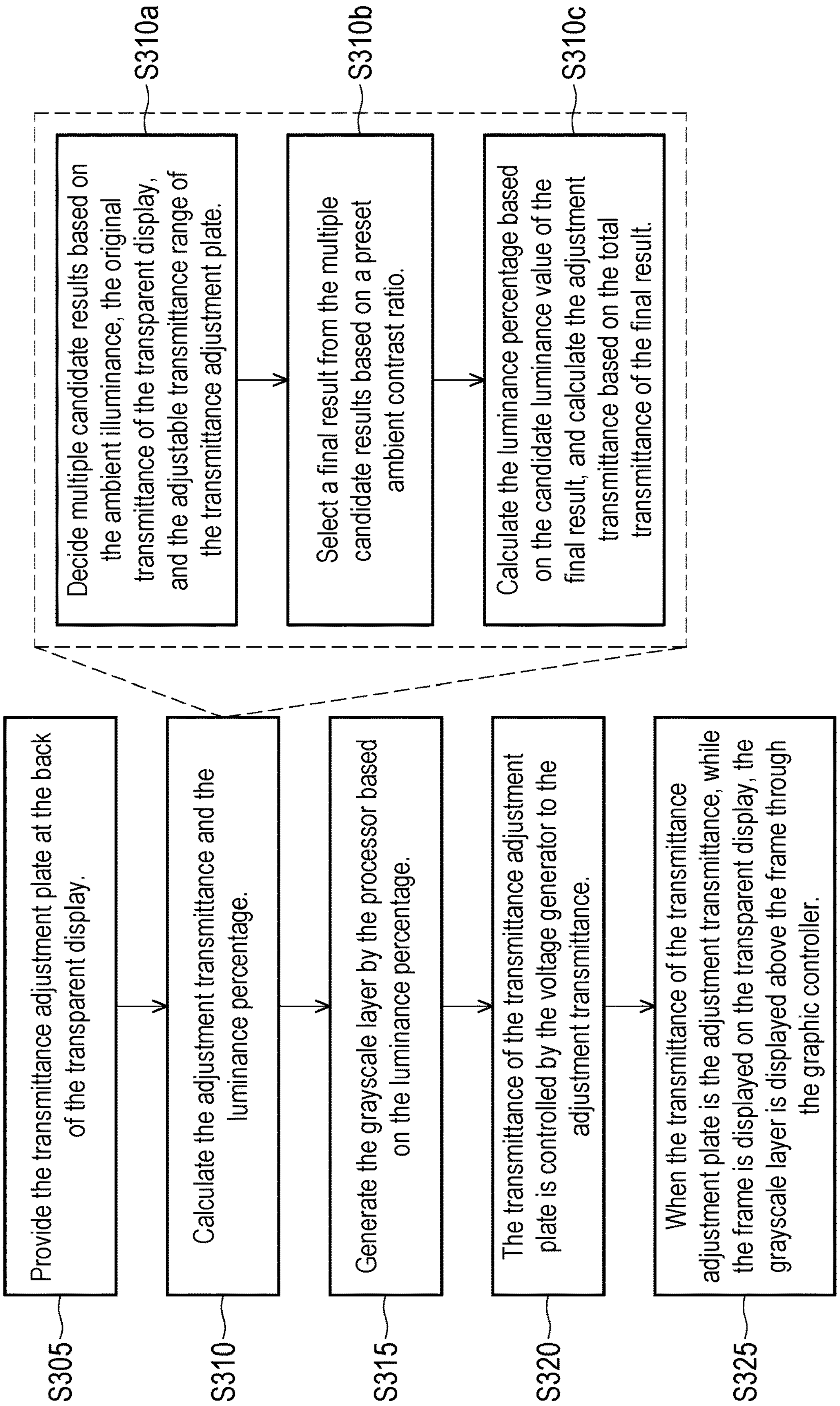
FIG. 3 is a flow chart of a method for adjusting ambient contrast ratio according to an embodiment of the disclosure.

FIG. 3 is a flow chart of a method for adjusting ambient contrast ratio according to an embodiment of the disclosure. Referring to FIG. 3, in step S305, the transmittance adjustment plate 130 is provided at the back of the transparent display 120. In step S310, the processor 110 calculates the adjustment transmittance for adjusting the transmittance adjustment plate 130 and a luminance percentage for adjusting the transparent display 120. Here, step S310 includes steps S310*a* to S310*c*.

In step S310*a*, multiple candidate results are decided based on the ambient illuminance, the original transmittance of the transparent display 120, and the adjustable transmittance range of the transmittance adjustment plate 130, wherein each candidate result includes a candidate luminance value and a total transmittance. The total transmittance refers to the transmittance of the transparent display 120 plus the transmittance adjustment plate 130.

The decision process of the multiple candidate results is as follows. First, the transmittance range is decided based on an original transmittance of the transparent display 120 and an adjustable transmittance range of the transmittance adjustment plate 130. Here, parameters $A_{min}$ and $A_{max}$ respectively represent a lower limit value and an upper limit value of the adjustable transmittance range, a parameter $T_D$ represents the original transmittance of the transparent display 120, and parameters $T_{min}$ and $T_{max}$ respectively represent a lower limit value and an upper limit value of the transmittance range. The transmittance range is calculated as follows:

$$T_{min}=T_D \times A_{min};$$

$$T_{max}=T_D \times A_{max}.$$

That is, the original transmittance $T_D$ respectively multiplied by the upper limit value $A_{max}$ and the lower limit value $A_{min}$ of the adjustable transmittance range, so as to obtain the upper limit value $T_{max}$ and the lower limit value $T_{min}$ of the adjustable transmittance range. For example, assuming that the original transmittance $T_D$ of the transparent display 120 is 50%, and the adjustable transmittance range of the transmittance adjustment plate 130 is 10% to 60%, then the transmittance range is 5% (50%×10%) to 30% (50%×60%).

After obtaining the transmittance range ($T_{min}$ to $T_{max}$), multiple candidate results are found from the related data of the ambient illuminance, display luminance of the transparent display 120, and ambient transmittance. In an embodiment, a storage device (not shown) of the electronic apparatus 100 pre-stores related data of the ambient illuminance, the display luminance of the transparent display 120 and the total transmittance. The following examples illustrate the related data.

Figure 4:
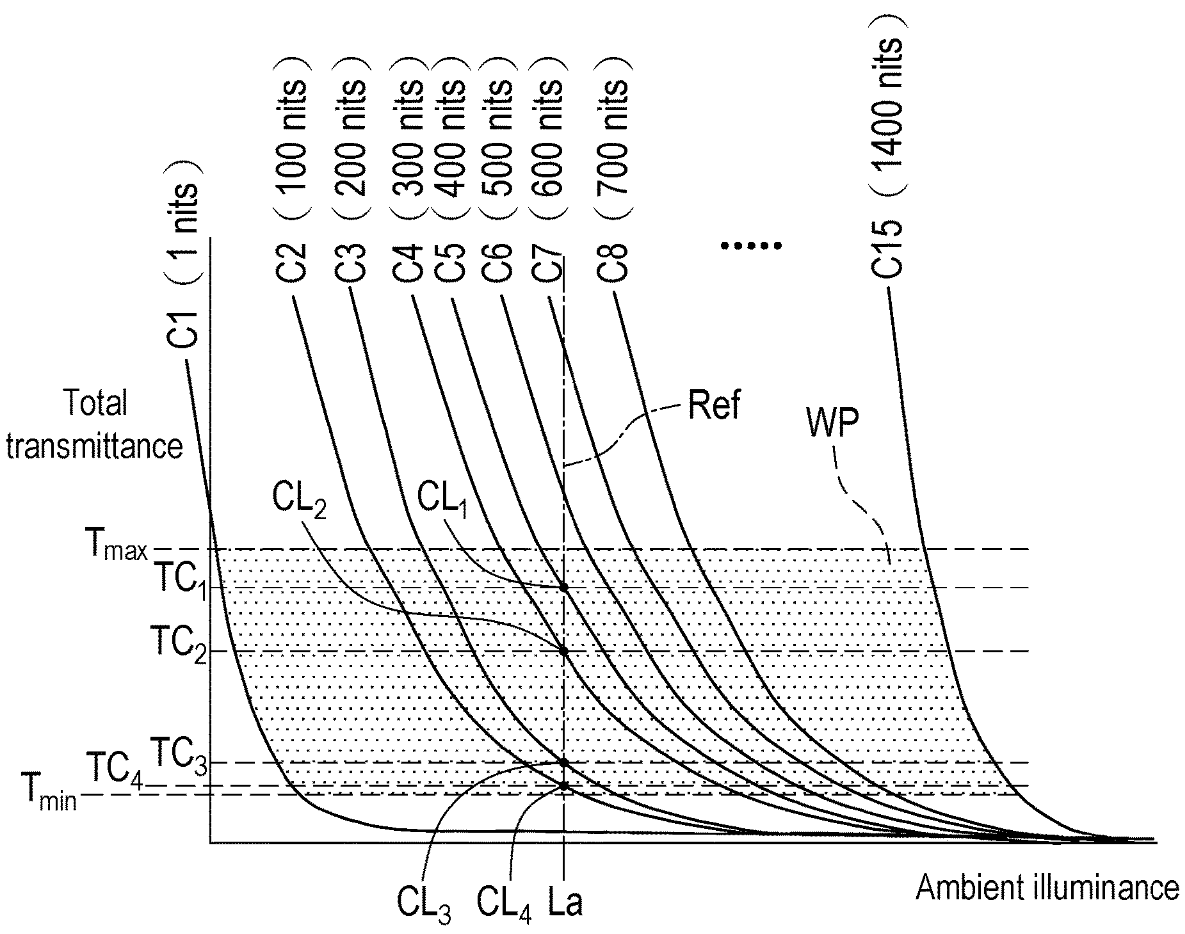
FIG. 4 is a schematic diagram of related data regarding ambient illuminance, display luminance of a transparent display and total transmittance according to an embodiment of the disclosure.

FIG. 4 is a schematic diagram of related data regarding ambient illuminance, display luminance of the transparent display and the total transmittance according to an embodiment of the disclosure. Referring to FIG. 4, the horizontal axis represents ambient illuminance (unit: lux), and the vertical axis represents the total transmittance of the transparent display 120 and the transmittance adjustment plate 130. Curves C1 to C15 in the diagram represent multiple display luminances (unit: nits) within the luminance range provided by the transparent display 120. The curve C1 corresponds to 1 nits, and the curves C2 to C15 correspond to 100 nits, 200 nits, 300 nits, . . . , 1400 nits. This is only an example, and in other embodiments, corresponding multiple curves may also be drawn every 1 nits, 10 nits, 20 nits, etc., and the number of curves is not limited.

In a first application example, based on the related data, the processor 110 finds multiple candidate luminance values in the luminance range supported by the transparent display 120 (assumed to be 1 nits to 1400 nits) by using an ambient illuminance La as an index. Then, within the transmittance range ($T_{min}$ to $T_{max}$), the total transmittance (the total transmittance multiplied by the transmittances of the transparent display 120 and the transmittance adjustment plate 130) corresponding to each candidate luminance value is extracted.

In terms of the related data shown in FIG. 4, a reference line Ref is obtained using the ambient illuminance La (i.e. the value currently obtained by the microcontroller board 160) as an index, and multiple candidate luminance values are obtained by extracting multiple curves (for example: C2 to C7) intersecting the reference line Ref from the curves C1 to C15. Then, total transmittances $TC_1$, $TC_2$, $TC_3$, and $TC_4$ corresponding to the candidate luminance values $CL_1$, $CL_2$, $CL_3$, and $CL_4$ within the transmittance range ($T_{min}$ to $T_{max}$) are extracted.

Moreover, in a second application example, based on the related data, the processor 110 searches every other value starting from the upper limit value $T_{max}$ or the lower limit value $T_{min}$ of the transmittance range, so as to find candidate luminance values and total transmittances related to the ambient illuminance La. Assume that the search is based on the total transmittance at intervals of 2% (for example, using the total transmittances $T_{min}$, $T_{min}$+2%, $T_{min}$+4%, $T_{min}$+6%, $T_{min}$+8%, . . . respectively). On the basis of the total transmittance $T_{min}$, if the reference line Ref does not intersect with any curve where the vertical axis is the total transmittance $T_{min}$, then the total transmittance $T_{min}$ is not used as the candidate result. On the basis of the total transmittance $T_{min}$+2% (assumed to be $TC_4$), if the reference line Ref intersects the curve C2 where the vertical axis is the total transmittance $T_{min}$+2%, then the total transmittance $TC_4$ and its corresponding candidate luminance value $CL_4$ are used as the candidate results. In a similar manner, candidate results are obtained.

Moreover, in practice, the processor 110 may also set a working range WP based on the luminance range of 1 nits to 1400 nits and the transmittance range $T_{min}$ to $T_{max}$ supported by the transparent display 120 so as to find multiple candidate results in the working range WP. By using the ambient illuminance La as an index, the curves C2, C3, C4, and C5 intersecting with the ambient illuminance La are extracted from the multiple curves C1 to Cn to obtain the candidate luminance values $CL_1$, $CL_2$, $CL_3$, and $CL_4$ within the working range WP. Then, the total transmittances $TC_1$, $TC_2$, $TC_3$, and $TC_4$ corresponding to the candidate luminance values $CL_1$, $CL_2$, $CL_3$, and $CL_4$ are extracted respectively, and then four candidate results ($CL_1$, $TC_1$), ($CL_2$, $TC_2$), ($CL_3$, $TC_3$), and ($CL_4$, $TC_4$) are obtained.

After the candidate results are obtained, in step S310*b*, a final result is selected from the multiple candidate results based on a preset ambient contrast ratio.

Figure 5:
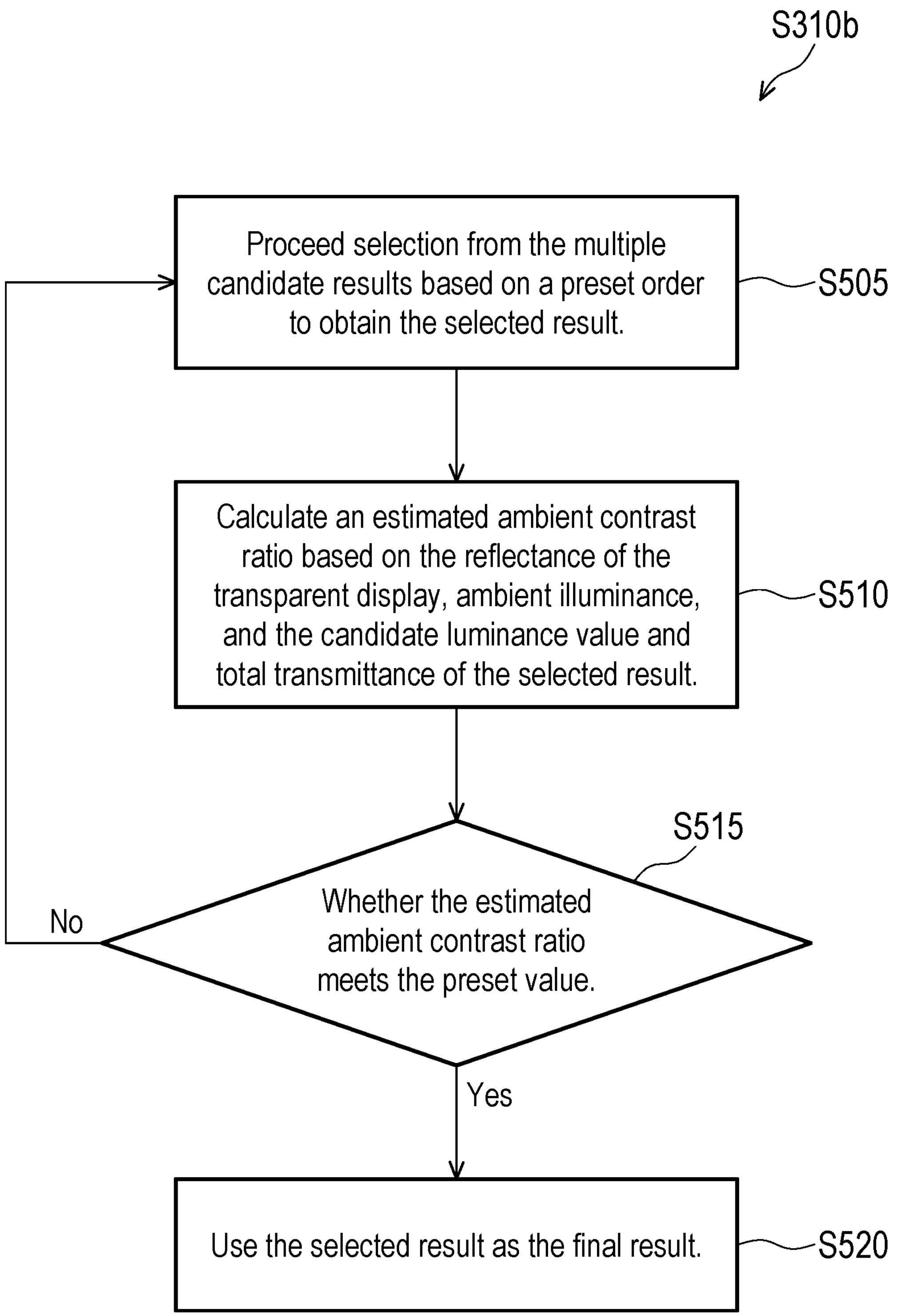
FIG. 5 is a flow chart of a method for selecting a final result according to an embodiment of the disclosure.

FIG. 5 is a flow chart of a method for selecting a final result according to an embodiment of the disclosure. FIG. 5 shows an implementation of step S310*b*. Referring to FIG. 5, in step S505, one of the multiple candidate results is selected as the selected result based on a preset order. For example, the preset order may be set as the order of candidate luminance value from large value to small value, the order of candidate luminance value from small value to large value, the order of total transmittance from large value to small value, or the order of total transmittance from small value to large value.

Next, in step S510, an estimated ambient contrast ratio is calculated based on the reflectance of the transparent display 120, ambient illuminance, and the candidate luminance value and total transmittance of the selected result. In an embodiment, the calculation of the estimated ambient contrast ratio is obtained using the following formula:

$$\text{ES\_ACR}_i = \frac{CL_i + (Rration \times La) + (TC_i \times La)}{(Rration \times La) + (TC_i \times La)},\ i \in [1, n]$$

$\text{ES\_ACR}_i$ is the estimated ambient contrast ratio, Rration is the reflectance of the transparent display 120, $CL_i$ is the candidate luminance value of the i-th selected result, $TC_i$ is the total transmittance of the i-th selected result, La is the ambient illuminance, and n is the number of all candidate results.

Then, in step S515, it is determined whether or not the estimated ambient contrast ratio meets the preset ambient contrast ratio. In an embodiment, the preset ambient contrast ratio may be set to 4. In the case of ACR=4, the gamma value is maintained at 2.2, which will not cause frame distortion. In response to the estimated ambient contrast ratio meeting the preset ambient contrast ratio, in step S520, the selected result is used as the final result. In response to the estimated ambient contrast ratio not meeting the preset ambient contrast ratio, the process returns to step S505, another one from the candidate results is selected as the selected result based on the preset order, and the estimated ambient contrast ratio is recalculated, until the calculated estimated ambient contrast ratio meets the preset ambient contrast ratio.

Moreover, if none of the multiple estimated ambient contrast ratios calculated from the candidate results meets the preset ambient contrast ratio, then the contrast range (for example, ACR=2.7 to 5.3) is reset, and based on the preset order, the candidate results are extracted one by one to determine whether or not the estimated ambient contrast ratio corresponding to each candidate result falls within the contrast range, such that when an estimated ambient contrast ratio falling within the contrast range is obtained, the candidate result corresponding to the estimated ambient contrast ratio is used as the final result. For example, whether or not $\text{ES\_ACR}_1$ to $\text{ES\_ACR}_n$ fall within the reset contrast range is determined one by one.

Returning to FIG. 3, after the final result is obtained, in step S310*c*, the luminance percentage is calculated based on the candidate luminance value of the final result, and the adjustment transmittance is calculated based on the total transmittance of the final result. For example, assume that the final result includes the candidate luminance value $CL_2$ and the total transmittance $TC_2$. The processor 110 calculates the luminance percentage based on the maximum display luminance of the transparent display 120 and the candidate luminance value $CL_2$. That is, the luminance percentage=the candidate luminance value $CL_2$÷the maximum display luminance×100%. Further, the processor 110 calculates the adjustment transmittance based on the total transmittance $TC_2$ and the original transmittance $T_D$ of the transparent display 120. That is, the adjustment transmittance=the total transmittance $TC_2$÷the original transmittance $T_D$.

Then, in step S315, the grayscale layer GL is generated by the processor 110 based on the luminance percentage. Further, in step S320, the transmittance of the transmittance adjustment plate 130 is controlled by the voltage generator 140 to the adjustment transmittance.

In step S325, when the transmittance of the transmittance adjustment plate 130 is the adjustment transmittance, while the frame is displayed on the transparent display 120, the grayscale layer GL is displayed above the frame through the graphic controller 150. In practice, the processor 110 may generate a grayscale adjustment command based on the luminance percentage through DirectX, and send the grayscale adjustment command to the graphic controller 150, then the graphic controller 150 controls the luminance of the pixel elements (for example, each light-emitting element of an LCD display panel) of the transparent display 120 based on the luminance percentage.

In practice, the processor 110 may be set to obtain the current ambient illuminance from the microcontroller board 160 at regular intervals (for example, 100 ms), and the steps S310 to S325 are executed to control the display luminance of the transparent display 120 and to adjust the adjustment transmittance of the transmittance adjustment plate 130 (controlling the illuminance of the transmitted light L3), so as to achieve the purpose of dynamically adjusting the ACR.

In summary, this disclosure adds a transmittance adjustment plate whose transmittance may be adjusted by voltage at the back of the transparent display, thereby adjusting the amount of ambient light entering the transparent display; and adds a grayscale layer on the top layer of the frame displayed on the transparent display layer by software, so as to adjust the display luminance of the transparent display. Accordingly, the ambient contrast ratio may be automatically adjusted according to the current ambient illuminance to maintain the visual effect experienced by the user. Moreover, the disclosure does not require changing the structure of the existing transparent display, but instead adds a transmittance adjustment plate and cooperates with software design to achieve the purpose of dynamically adjusting the ACR.

It will be apparent to those skilled in the art that various modifications and variations may be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method for adjusting ambient contrast ratio for a transparent display, the method comprises:

providing a transmittance adjustment plate at a back of the transparent display;

calculating an adjustment transmittance for adjusting the transmittance adjustment plate and a luminance percentage for adjusting the transparent display by using a processor, which comprises:

deciding a plurality of candidate results based on an ambient illuminance, an original transmittance of the transparent display, and an adjustable transmittance range of the transmittance adjustment plate, wherein each of the candidate results comprises a candidate luminance value and a total transmittance;

selecting a final result from the candidate results based on a preset ambient contrast ratio; and calculating the luminance percentage based on the candidate luminance value of the final result, and calculating the adjustment transmittance based on the total transmittance of the final result;

generating a grayscale layer through the processor based on the luminance percentage;

controlling a transmittance of the transmittance adjustment plate through a voltage generator to the adjustment transmittance; and in response to the transmittance of the transmittance adjustment plate being the adjustment transmittance, while a frame is displayed on the transparent display, displaying the grayscale layer above the frame through a graphic controller.

2. The method for adjusting ambient contrast ratio according to claim 1, wherein a step of deciding the candidate results based on the ambient illuminance, the original transmittance of the transparent display, and the adjustable transmittance range of the transmittance adjustment plate comprises:

deciding a transmittance range based on the original transmittance of the transparent display and the adjustable transmittance range of the transmittance adjustment plate;

finding a plurality of the candidate luminance values in a luminance range supported by the transparent display, by using the ambient illuminance as an index; and extracting the total transmittance corresponding to each of the candidate luminance values within the transmittance range.

3. The method for adjusting ambient contrast ratio according to claim 1, wherein a step of deciding the candidate results based on the ambient illuminance, the original transmittance of the transparent display, and the adjustable transmittance range of the transmittance adjustment plate comprises:

deciding a transmittance range based on the original transmittance of the transparent display and the adjustable transmittance range of the transmittance adjustment plate; and starting from an upper limit value or a lower limit value of the transmittance range, performing a search every other value so as to find the candidate luminance value and the total transmittance related to the ambient illuminance.

4. The method for adjusting ambient contrast ratio according to claim 1, wherein a step of selecting the final result from the candidate results based on the preset ambient contrast ratio comprises:

selecting one from the candidate results as a selected result based on a preset order;

calculating an estimated ambient contrast ratio based on a reflectance of the transparent display, the ambient illuminance, and the candidate luminance value and the total transmittance of the selected result;

determining whether or not the estimated ambient contrast ratio meets the preset ambient contrast ratio;

in response to the estimated ambient contrast ratio meeting the preset ambient contrast ratio, using the selected result as the final result; and in response to the estimated ambient contrast ratio not meeting the preset ambient contrast ratio, based on the preset order, selecting another one from the candidate results as the selected result and recalculating the estimated ambient contrast ratio until the calculated estimated ambient contrast ratio meets the preset ambient contrast ratio.

5. The method for adjusting ambient contrast ratio according to claim 4, wherein the calculation of the estimated ambient contrast ratio is obtained by a following formula:

$$\text{ES\_ACR}_i = \frac{CL_i + (Rration \times La) + (TC_i \times La)}{(Rration \times La) + (TC_i \times La)},\ i \in [1, n]$$

wherein $\text{ES\_ACR}_i$ is the estimated ambient contrast ratio, Rration is the reflectance of the transparent display, $CL_i$ is the candidate luminance value of the selected result, $TC_i$ is the total transmittance of the selected result, La is the ambient illuminance, and n is a number of the candidate results.

6. The method for adjusting ambient contrast ratio according to claim 4, further comprising:

in response to none of a plurality of the estimated ambient contrast ratios calculated from the candidate results meeting the preset ambient contrast ratio, resetting a contrast range, and based on the preset order, extracting the candidate results one by one so as to determine whether or not the estimated ambient contrast ratio corresponding to each of the candidate results falls within the contrast range, such that when the estimated ambient contrast ratio falling within the contrast range is obtained, a candidate result corresponding to the estimated ambient contrast ratio is used as the final result.

7. The method for adjusting ambient contrast ratio according to claim 1, further comprising:

sensing the ambient illuminance through a light source sensor.

8. An electronic apparatus, comprising:

a transparent display;

a transmittance adjustment plate, provided at a back of the transparent display;

a voltage generator, coupled to the transmittance adjustment plate;

a graphic controller, coupled to the transparent display;

a processor, coupled to the voltage generator and the graphic controller to:

calculate an adjustment transmittance for adjusting the transmittance adjustment plate and a luminance percentage for adjusting the transparent display, which comprises:

deciding a plurality of candidate results based on an ambient illuminance, an original transmittance of the transparent display, and an adjustable transmittance range of the transmittance adjustment plate, wherein each of the candidate results comprises a candidate luminance value and a total transmittance;

selecting a final result from the candidate results based on a preset ambient contrast ratio; and calculating the luminance percentage based on the candidate luminance value of the final result, and calculating the adjustment transmittance based on the total transmittance of the final result;

generating a grayscale layer based on the luminance percentage;

controlling a transmittance of the transmittance adjustment plate through the voltage generator to the adjustment transmittance; and in response to the transmittance of the transmittance adjustment plate being the adjustment transmittance, while a frame is displayed on the transparent display, displaying the grayscale layer above the frame through the graphic controller.

9. The electronic apparatus according to claim 8, wherein the processor is configured to decide the candidate results based on a first process or a second process, wherein the first process comprises:

deciding a transmittance range based on the original transmittance of the transparent display and the adjustable transmittance range of the transmittance adjustment plate;

finding a plurality of the candidate luminance values in a luminance range supported by the transparent display, by using the ambient illuminance as an index; and extracting the total transmittance corresponding to each of the candidate luminance values within the transmittance range, and the second process comprises:

deciding the transmittance range based on the original transmittance of the transparent display and the adjustable transmittance range of the transmittance adjustment plate; and starting from an upper limit value or a lower limit value of the transmittance range, performing a search every other value so as to find the candidate luminance value and the total transmittance related to the ambient illuminance.

10. The electronic apparatus according to claim 8, wherein the processor is configured to:

select one from the candidate results as a selected result based on a preset order;

calculate an estimated ambient contrast ratio based on a reflectance of the transparent display, the ambient illuminance, and the candidate luminance value and the total transmittance of the selected result;

determine whether or not the estimated ambient contrast ratio meets the preset ambient contrast ratio;

in response to the estimated ambient contrast ratio meeting the preset ambient contrast ratio, use the selected result as the final result; and in response to the estimated ambient contrast ratio not meeting the preset ambient contrast ratio, based on the preset order, select another one from the candidate results as the selected result and recalculate the estimated ambient contrast ratio until the calculated estimated ambient contrast ratio meets the preset ambient contrast ratio, wherein the calculation of the estimated ambient contrast ratio is obtained by a following formula:

$$\text{ES\_ACR}_i = \frac{CL_i + (Rration \times La) + (TC_i \times La)}{(Rration \times La) + (TC_i \times La)},\ i \in [1, n]$$

wherein $\text{ES\_ACR}_i$ is the estimated ambient contrast ratio, Rration is the reflectance of the transparent display, $CL_i$ is the candidate luminance value of the selected result, $TC_i$ is the total transmittance of the selected result, La is the ambient illuminance, and n is a number of the candidate results.

11. The electronic apparatus according to claim 10, wherein the processor is configured to:

in response to none of a plurality of the estimated ambient contrast ratios calculated from the candidate results meeting the preset ambient contrast ratio, reset a contrast range, and based on the preset order, extract the candidate results one by one so as to determine whether or not the estimated ambient contrast ratio corresponding to each of the candidate results falls within the contrast range, such that when the estimated ambient contrast ratio falling within the contrast range is obtained, a candidate result corresponding to the estimated ambient contrast ratio is used as the final result.

* * * * *